(12) United States Patent
Ichida et al.

(10) Patent No.: US 8,736,920 B2
(45) Date of Patent: May 27, 2014

(54) IMAGE READING DEVICE AND INFORMATION INPUT METHOD

(71) Applicant: PFU Limited, Kahoku (JP)

(72) Inventors: Motoharu Ichida, Ishikawa (JP); Norihiro Yamasaku, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/646,528

(22) Filed: Oct. 5, 2012

(65) Prior Publication Data

US 2013/0088758 A1    Apr. 11, 2013

(51) Int. Cl.
*G06F 3/12*     (2006.01)
*G06K 15/00*    (2006.01)
*H04N 1/60*     (2006.01)
*H04N 1/04*     (2006.01)

(52) U.S. Cl.
USPC .......... 358/474; 358/1.15; 358/1.18; 358/1.9; 358/494

(58) Field of Classification Search
USPC ......... 358/474, 468, 476, 488, 494, 496, 497, 358/498, 301, 540, 1.15, 1.16, 1.1, 1.18, 358/1.6, 1.9, 1.17; 382/80, 16, 29, 40, 47, 382/63, 95, 104, 118, 121, 151, 356, 367, 382/371, 372, 379; 340/854.8, 539.26, 547, 340/545.2, 549, 4.42, 4.62, 5.61
See application file for complete search history.

(56) References Cited

U.S. PATENT DOCUMENTS

2008/0062451 A1* 3/2008 Yamazaki ................. 358/1.14
2009/0201560 A1* 8/2009 Hashimoto ................ 358/474

FOREIGN PATENT DOCUMENTS

JP    2006-134054 A    5/2006
JP    2006-203630 A    8/2006

OTHER PUBLICATIONS

Toshihiko, IC Card Reader/Writer, May 25, 2006, Machine Translation, JP2006134054, all pages.*

* cited by examiner

*Primary Examiner* — Ngon Nguyen
(74) *Attorney, Agent, or Firm* — McDermott Will & Emery LLP

(57) ABSTRACT

There is provided an image reading device including: a manuscript table on which a manuscript is placed; an image reading section that optically reads an image from the manuscript placed on the manuscript table; an information acquisition section that acquires information in wireless communication from an IC chip attached to the manuscript placed on the manuscript table; and a control section that controls a timing of image reading by the image reading section in accordance with a timing of information acquisition by the information acquisition section.

7 Claims, 4 Drawing Sheets

IMAGE READING DEVICE AND INFORMATION INPUT METHOD

CROSS-REFERENCE TO RELATED APPLICATIONS

This application is based on and claims priority under 35 USC 119 from Japanese Patent Application No. 2011-223142 filed Oct. 7, 2011.

FIELD

The present invention relates to an image reading device and an information input method.

BACKGROUND

For example, JP2006-134054(A1) discloses an IC card reader/writer that includes an image scanning section which optically reads an image on the ticket surface of a non-contact type IC card.

Further, JP2006-203630(A1) discloses an image reading device including: a manuscript table on which a manuscript is placed; a manuscript scanning section that moves a manuscript placed on the manuscript table in a sub-scanning direction to scan it optically; and an image reading section that optically reads an image of the scanned manuscript and converts it into electronic data, the image reading device including a section that includes, on the manuscript scanning section, at least one communication antenna which communicates with a wireless communication element including a memory and an antenna, thereby reading information from and writing it to the memory in the wireless communication element via the communication antenna.

SUMMARY

According to an aspect of the invention, there is provided an image reading device including: a manuscript table on which a manuscript is placed; an image reading section that optically reads an image from the manuscript placed on the manuscript table; an information acquisition section that acquires information in wireless communication from an IC chip attached to the manuscript placed on the manuscript table; and a control section that controls a timing of image reading by the image reading section in accordance with a timing of information acquisition by the information acquisition section.

According to another aspect of the invention, there is provided an information input method including: an information acquisition step of acquiring information in wireless communication from an IC chip attached to a manuscript placed on a manuscript table; and an image reading step of optically reading an image from the manuscript placed on the manuscript table in accordance with the operating timing in the information acquisition step.

According to another aspect of the invention, there is provided an information input method including: an image reading step of optically reading an image from a manuscript placed on a manuscript table; and an information acquisition step of acquiring information in wireless communication from an IC chip attached to the manuscript placed on the manuscript table in accordance with the operation timing of the image reading step.

BRIEF DESCRIPTION OF DRAWINGS

An exemplary embodiment of the present invention will be described in detail based on the following figures, wherein.

DESCRIPTION OF EMBODIMENT

First a description will be given of a background and an outline of the present embodiment.

An image reading device 1 according to the embodiment has a function to acquire information from an IC chip attached to a manuscript by utilizing electromagnetic induction and a function to read an image from the manuscript optically. Further, the image reading device 1 is a handy device having a size of a depth of not more than 30 cm, a width of not more than 30 cm, and a height of not more than 30 cm (preferably, not more than 5 cm). The image reading device 1 of the present embodiment can easily be carried to anywhere and does not need a large space to mount through miniaturization, thereby realizing convenience.

However, the small-sized image reading device 1 needs to house components in a small space in order to realize those functions. Those components, therefore, may possibly interfere with each other. For example, non-contact type IC scanning involves communication that utilizes electromagnetic induction based on a magnetic field between an antenna and an IC chip. Accordingly, it is found that during communication, a strong magnetic field occurs and has an influence on the components (in particular, electronic components) which engage in image reading operations. Further, some of the image reading components are metallic ones, which may possibly have an influence on a magnetic field generated by the antenna.

The antenna provided in the image reading device 1 of the present embodiment has a shape of a loop including a region not smaller than the A6 size. The magnetic field around the center of the reading region of the loop antenna tends to be weaker than that around it. Therefore, when a reading face (manuscript table) is relatively large, it is necessary to set output intensity of the antenna in at least a constant level in order to keep up magnetic field intensity near the center of a reading region. In other words, it is impossible to suppress an antenna output down to a level not affecting the image reading operations. Further, larger magnetic field intensity may possibly destroy the IC chip, so that it is necessary to eliminate fluctuations in magnetic field intensity as much as possible because an allowable range of the antenna output intensity is reduced.

In order to solve the problem, the image reading device 1 of the present embodiment exclusively control timing for image reading operations and timing for information acquiring operations to acquire information from the IC chip.

The following will describe an exterior configuration of the present embodiment of the invention with reference to drawings. However, the scope of the present invention is not limited to illustrated examples.

Figure 1:
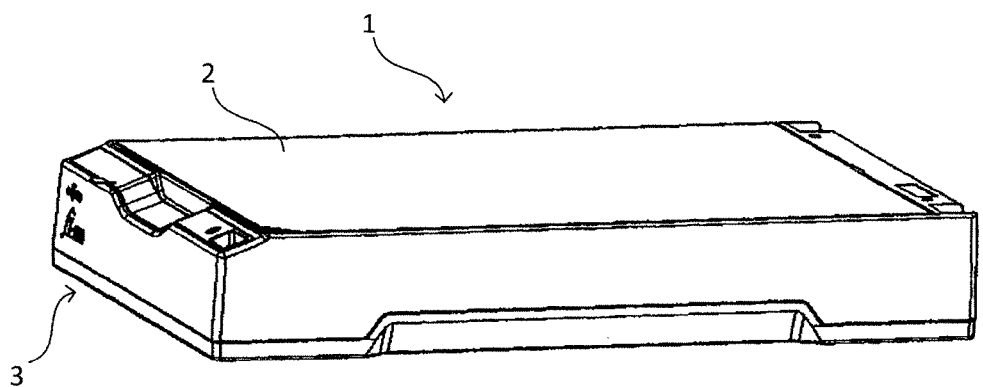
FIG. 1 is a perspective view of an image reading device 1 according to the embodiment.

FIG. 1 is a perspective view of the image reading device 1 according to the embodiment.

Figure 2:
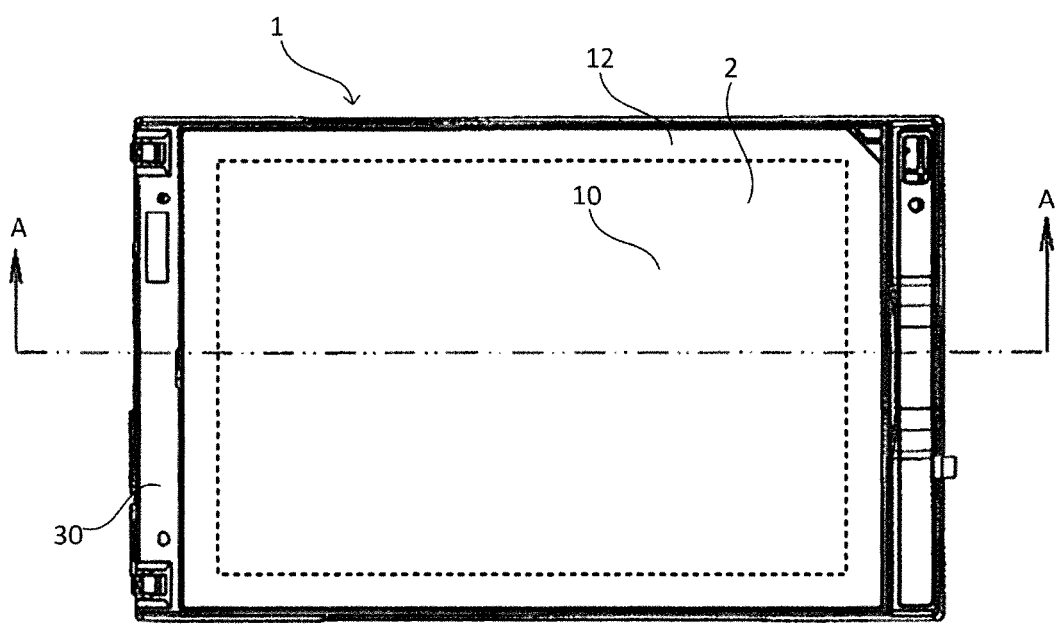
FIG. 2 is a plan view of the image reading device 1 according to the embodiment shown in FIG. 1.

FIG. 2 is a plan view of the image reading device 1 according to the embodiment shown in FIG. 1.

As illustrated in FIGS. 1 and 2, the image reading device 1 includes a glass plate 2 on which a manuscript can be placed and a chassis 3 which houses a mechanical portion. The chassis 3 can include a manuscript table cover (not shown) which can fix a manuscript placed.

The glass plate 2 is a square, transparent sheet-shaped member. The glass plate 2 in this example is made of glass but may be made of any other materials as long as they have magnetic permeability, for example, transparent plastic.

The glass plate 2 has an antenna 20, an antenna affixing region 12, and a reading face 10 on its surface. To the antenna affixing region 12, the antenna 20 is affixed. The reading face 10 is a region surrounded by the antenna 20 and functions as a manuscript table.

The antenna 20 is loop-shaped and made of a material through which an electric current can flow. To scan the non-contact type IC chip attached to a manuscript, the antenna 20 generates a magnetic field corresponding to the non-contact type IC chip to give rise to electromotive force in it in order to perform communication. The antenna 20 in this example is fixed to a side of the glass plate 2 that faces the chassis 3 and disposed to form a loop along an edge of the glass plate 2.

An output of the antenna 20 is set taking into account an influence from a bottom surface steel plate 50 to be described later. Specifically, the output intensity of the antenna 20 is set to a level so that IC information can be read from the disposed IC chip no matter whether there is a static influence from the bottom surface steel plate 50 and no matter where on the reading face 10 the IC chip is disposed.

The antenna affixing region 12 is on the glass plate 2 to which the loop-shaped antenna 20 is affixed. The antenna affixing region 12 is also a region where the placed manuscript cannot be scanned optically.

The reading face 10 is surrounded by the antenna affixing region 12. Through the reading face 10, an inside of the chassis 3 can be seen in order to optically scan the placed manuscript. On the reading face 10, a manuscript whose image is to be read or a medium (which is also hereinafter referred to as a manuscript) to which the non-contact type IC chip is attached is to be placed. The reading face 10 is set to the A6 size (105 mm by 148 mm) or a size that can contain one side of a passport.

Figure 3:
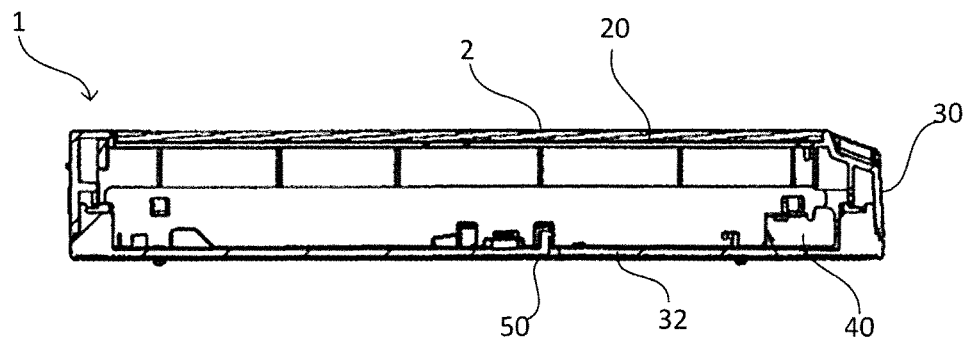
FIG. 3 is a cross-sectional view taken along line A-A of FIG. 2.

FIG. 3 is a cross-sectional view taken along line A-A of FIG. 2.

Figure 4:
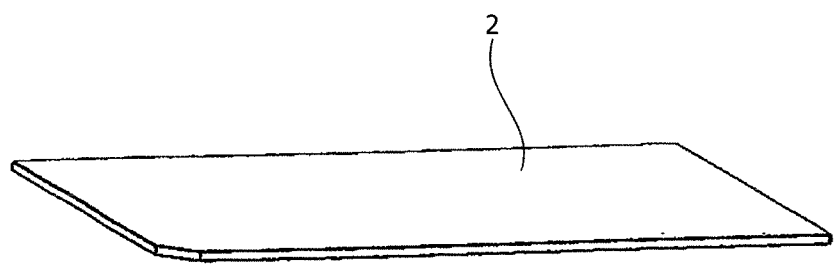
FIG. 4 is a perspective view illustrating a glass plate 2.

FIG. 4 is a perspective view illustrating the glass plate 2.

Figure 5:
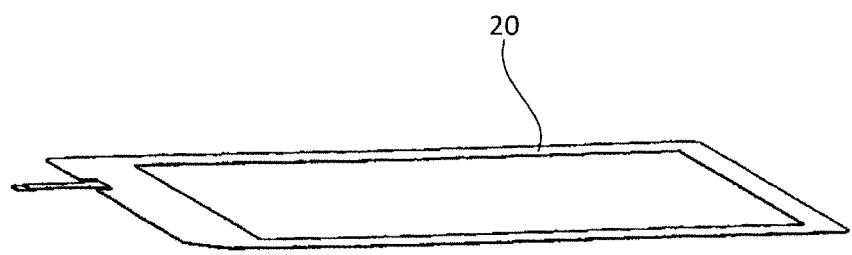
FIG. 5 is a perspective view illustrating an antenna 20.

FIG. 5 is a perspective view illustrating the antenna 20.

Figure 6:
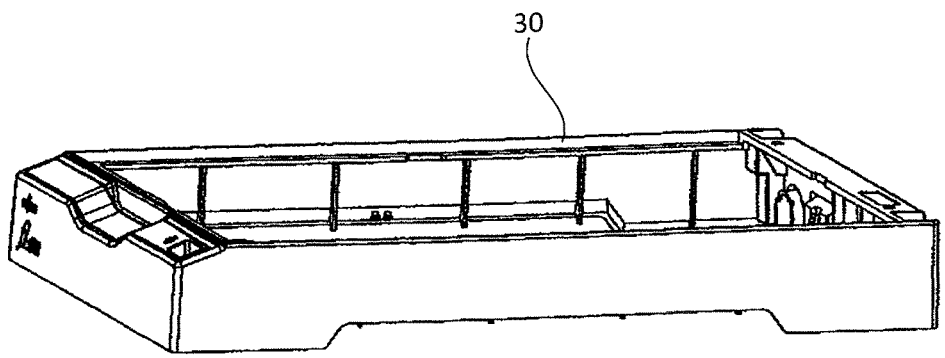
FIG. 6 is a perspective view illustrating a top cover 30.

FIG. 6 is a perspective view illustrating a top cover 30.

Figure 7:
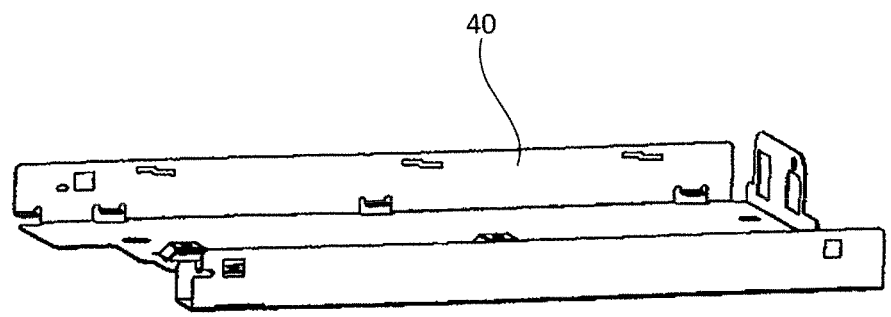
FIG. 7 is a perspective view illustrating a shield steel plate 40.

FIG. 7 is a perspective view illustrating a shield steel plate 40.

Figure 8:
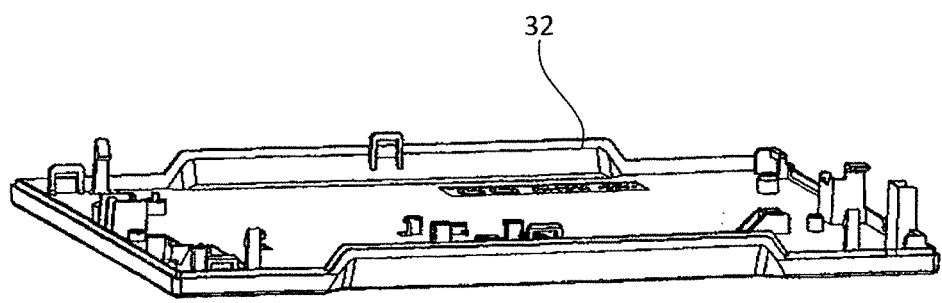
FIG. 8 is a perspective view illustrating a base frame 32.

FIG. 8 is a perspective view illustrating a base frame 32.

Figure 9:
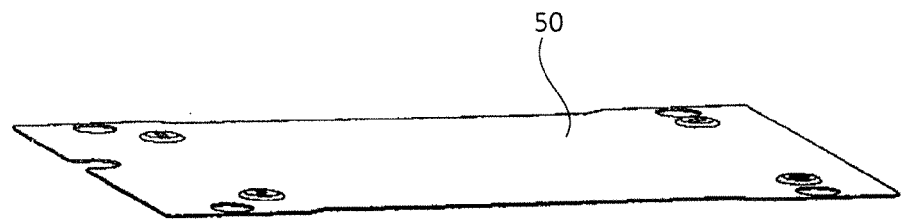
FIG. 9 is a perspective view illustrating a bottom surface steel plate 50.

FIG. 9 is a perspective view illustrating a bottom surface steel plate 50.

As shown in FIGS. 3 to 9, the chassis 3 includes the top cover 30 constituting its side surface and the base frame 32 constituting its bottom surface. The shield steel plate 40 is disposed inside the chassis 3, and the bottom surface steel plate 50 is disposed on the bottom surface of the chassis 3.

As illustrated in FIG. 6, the top cover 30 is side surface armor of the chassis 3 of the image reading device 1. The top cover 30 is made of a non-metallic material, for example, synthetic resin. The top cover 30 is shaped like a rectangular solid and has a large opening in its upper surface portion and lower surface portion. Further, the top cover 30 has a recess used to lift the manuscript table cover and has a power supply button disposed near it configured to actuate the image reading device 1.

The shield steel plate 40 is an interior framework of the image reading device 1 as illustrated in FIG. 7. The shield steel plate 40 is made of metal, for example, stainless, aluminum, copper, or iron. The shield steel plate 40 has a roughly quadrangular shape of a size which can be contained under the top cover 30, and has its end erected almost vertically so that it can be fixed.

The shield steel plate 40 is positioned apart from the antenna 20 by not less than 10 mm to shield electromagnetic waves generated by a control device (not shown).

The base frame 32 is bottom surface armor of the chassis 3 of the image reading device 1 as illustrated in FIG. 8. The base frame 32 is made of a non-metallic material, for example, synthesis resin. The base frame 32 is quadrangular and has a size that matches the top cover 30. The base frame 32 has a constriction to hold the image reading device 1 at each end in the sub-scanning direction so that it can easily be carried around.

The bottom surface steel plate 50 is a sheet-shaped metal member as illustrated in FIG. 9 and made of, for example, stainless, aluminum, copper, or iron. The bottom surface steel plate 50 is one example of a fluctuation easing member according to the invention.

The bottom surface steel plate 50 has a function to prevent the image reading device 1 from being influenced by an environment in which it is mounted.

The bottom surface steel plate 50 in this example is a roughly quadrangular plate having a larger area than an outer circumference of the antenna 20. Further, the bottom surface steel plate 50 in this example has an attachment hole for fixation and a projection configured to maintain some distance from the base frame 32 at each of its four corners. The attachment hole formed in the bottom surface steel plate 50 has a diameter of not more than 13 mm. Further, when the image reading device 1 is viewed from perpendicularly above, the attachment hole formed in the bottom surface steel plate 50 is disposed more outside than the antenna 20. Besides the attachment hole, the bottom surface steel plate 50 can include a hole formed in it. However, it is preferable that the hole has a diameter of not more than 13 mm and is disposed more outside than the antenna 20. Further, the bottom surface steel plate 50 is positioned apart from the antenna 20 by at least 10 mm.

Further, the chassis 3 is provided with a movable unit (not shown) for reading an image from the manuscript. An upper portion of the movable unit (that is, its portion close to the glass plate 2) is provided with a light guiding body formed of a non-metallic member and a lower portion of this unit (i.e. its portion far away from the glass plate 2) is provided with a light receiving element including a metallic portion. The light receiving elements are arranged in a longer direction (main scanning direction) of the movable unit to form a linear image sensor.

In image reading, the movable unit moves in the sub-scanning direction below the glass plate 2 in the vicinity of this glass plate 2, thereby picking up light guided by the light guiding body and reflected by the manuscript by using the light receiving elements.

Further, the chassis 3 houses an IC information acquisition section (not shown), a control device, and a power supply section (not shown). The IC information acquisition section reads IC information from the IC chip via the antenna 20. The control device controls the IC information acquisition section and the movable unit. The power supply section supplies power in other components such as the antenna 20, the movable unit, and the IC information acquisition section.

Figure 10:
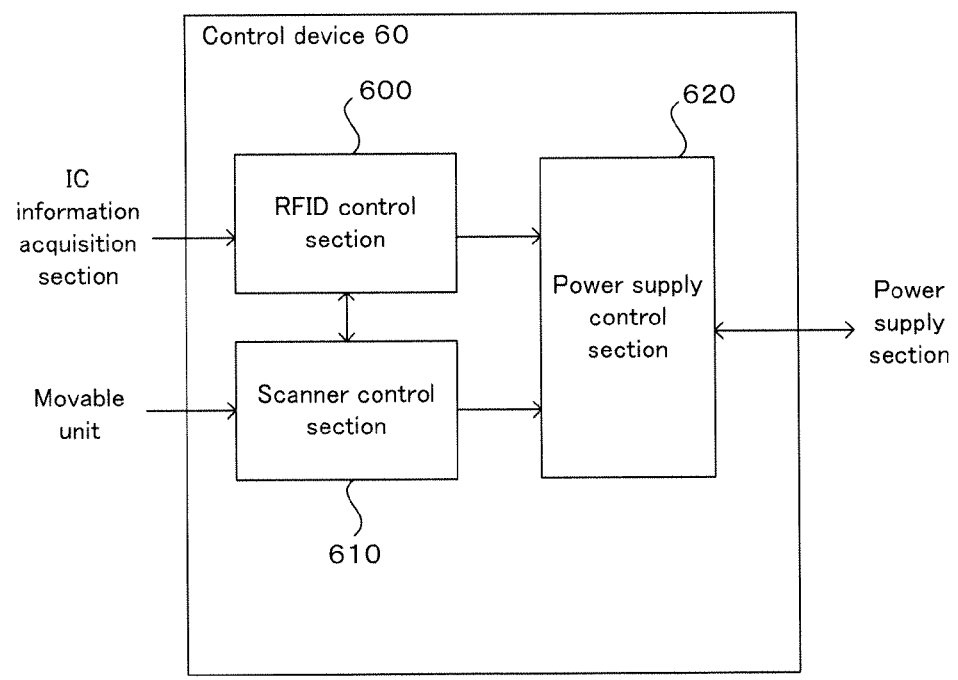
FIG. 10 is a view illustrating a function configuration of a control device 60.

FIG. 10 is a view illustrating a function configuration of a control device 60.

As illustrated in FIG. 10, the control device 60 has an RFID control section 600, a scanner control section 610, and a power supply control section 620.

The RFID control section 600 controls wireless communication via the antenna 20 in cooperation with the IC information acquisition section. Specifically, the RFID control section 600 controls information acquisition operations to read IC information from the IC chip. For example, the RFID control section 600 prohibits information acquisition by conducting control so that no magnetic field is generated by the antenna 20 in a period when an image is being read by the movable unit. Further, the RFID control section 600 prohibits information acquisition in a predetermined period since a timing when power supply is started by the power supply control section 620 (for example, until initialization is completed).

The scanner control section 610 controls image reading by controlling the movable unit. For example, the scanner control section 610 prohibits image reading by moving the movable unit to its home position (more outside than the antenna 20) in a period when a magnetic field is generated by the antenna 20 (that is, in an information acquiring period). Further, the scanner control section 610 prohibits image reading in a predetermined period since power supply is started by the power supply control section 620.

The power supply control section 620 controls power supply to the components of the image reading device 1 by controlling the power supply section. For example, once having detected that a power supply button provided on the top cover 30 is pressed, the power supply control section 620 instructs the power supply section to start power supply and notifies the RFID control section 600 and the scanner control section 610 of the power supply start. Then, if initialization of the components of the image reading device 1 is completed, the power supply control section 620 notifies the RFID control section 600 and the scanner control section 610 of the completion.

Next, a description will be given of a method of inputting information by using the components described above.

Once the power supply button is pressed, the image reading device 1 starts power supply and initialization and, when the initialization is completed, allows operations to acquire information from the IC chip and read an image from the manuscript (Step 10).

Next, once having received an information reading instruction, the image reading device 1 fixes the movable unit to the home position and starts to acquire information from the IC chip. During this period, image reading is prohibited (Step 20).

When the IC chip information acquisition operations are completed, the image reading device 1 automatically starts image reading operations. During this period, the image reading operations (generation of an electromagnetic field by the antenna 20) is prohibited (Step 30).

When the image reading operations are completed, the image reading device 1 outputs the read image and the IC information acquired from the IC chip to an outside as information read from the same manuscript (Step 40).

Although In this example, the information acquisition processing (Step 20) and the image reading processing (Step 30) have been performed in this order, the order may be reversed.

As described above, the image reading device 1 exclusively controls the information acquisition from the IC chip and the image reading to thereby prevent them from interfering with each other. Thus, the quality of the read image is inhibited from being degraded. Further, failure in communication with the IC chip is also inhibited.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a manuscript table on which a manuscript is placed;
   an antenna disposed around the manuscript table;
   a movable unit including a light receiving element and configured to read an image from the manuscript placed on the manuscript table as moving in a sub-scanning direction of the manuscript below the manuscript table and in the vicinity of the manuscript table;
   an information acquisition section configured to acquire information wirelessly via the antenna from an IC chip attached to the manuscript on the manuscript table; and
   a controller configured to prohibit information acquisition by the information acquisition section so that no magnetic field is generated by the antenna in a period when an image is being read by the movable unit, wherein
   the controller is further configured to set output intensity of the antenna to a level so that the information is read from the IC chip no matter where on the manuscript table the IC chip is disposed.

2. The image reading device according to claim 1, wherein the controller prohibits information acquisition by the information acquisition section during a period when the image is being read by the movable unit and prohibits image reading by the movable unit during a period when the information is being acquired by the information acquisition section.

3. The image reading device according to claim 2, wherein the controller moves the movable unit to a predetermined position when information is acquired by the information acquisition section.

4. The image reading device according to claim 3, wherein the manuscript table is formed of a transparent sheet-shaped member;
   the antenna is disposed around the manuscript table; and
   the controller moves the movable unit to a predetermined relative position with respect to the antenna when the information is acquired by the information acquisition section.

5. The image reading device according to claim 4, further comprising a power supply section that supplies power to the movable unit and the information acquisition section, wherein controller prohibits image reading by the movable unit and information acquisition by the information acquisition section during a predetermined period since power supply from the power supply section is started.

6. An information input method for an image reading device including an image reader and a controller for controlling the image reader to read an image of a manuscript, the information input method comprising:

reading the image from the manuscript placed on a manuscript table by moving the image reader in a sub-scanning direction of the manuscript below the manuscript table and in the vicinity of the manuscript table;

acquiring information wirelessly via an antenna of the image reader from an IC chip attached to the manuscript on the manuscript table; and prohibiting, by the controller, information acquisition by the information acquiring step so that no magnetic field is generated by the antenna in a period when an image is being read by the image reader, setting, by the controller, output intensity of the antenna to a level so that the information is read from the IC chip no matter where on the manuscript table the IC chip is disposed, wherein the image reading step is performed in accordance with an operating timing in the information acquiring step.

7. An information input method for an image reading device including an image reader and a controller for controlling the image reader to read an image of a manuscript, the information input method comprising:

reading an image from a manuscript placed on a manuscript table by moving the image reader in a sub-scanning direction of the manuscript below the manuscript table and in the vicinity of the manuscript table;

acquiring information wirelessly via an antenna of the image reader from an IC chip, attached to the manuscript on the manuscript table; and prohibiting, by the controller, information acquisition by the information acquiring step so that no magnetic field is generated by the antenna in a period when an image is being read by the image reader, setting, by the controller, output intensity of the antenna to a level so that the information is read from the IC chip no matter where on the manuscript table the IC chip is disposed, wherein the information acquiring step is performed in accordance with an operation timing of the image reading step.

* * * * *